(12) United States Patent
Stewart et al.

(10) Patent No.: US 12,204,581 B2
(45) Date of Patent: Jan. 21, 2025

(54) MASSIVELY DISTRIBUTED METACOMPOSITION SYSTEMS AND METHODS

(71) Applicant: MASARY STUDIOS, Boston, MA (US)

(72) Inventors: Jeremy Stewart, Worcester, MA (US); Ryan Edwards, Quincy, MA (US); Sam Okerstrom-Lang, Boston, MA (US)

(73) Assignee: MASARY STUDIOS, Boston, MA (US)

( * ) Notice: Subject to any disclaimer, the term of this patent is extended or adjusted under 35 U.S.C. 154(b) by 0 days.

(21) Appl. No.: 17/515,308

(22) Filed: Oct. 29, 2021

(65) Prior Publication Data

US 2023/0133432 A1 May 4, 2023

(51) Int. Cl.
*G06F 16/00* (2019.01)
*G06F 7/00* (2006.01)
*G06F 16/435* (2019.01)
*G06F 16/438* (2019.01)

(52) U.S. Cl.
CPC ........ *G06F 16/4387* (2019.01); *G06F 16/435* (2019.01)

(58) Field of Classification Search
CPC .......................... G06F 16/4387; G06F 16/435
USPC ........................................................ 707/722
See application file for complete search history.

(56) References Cited

U.S. PATENT DOCUMENTS

| | | | | |
|---|---|---|---|---|
| 2017/0017658 A1* | 1/2017 | Blong | ................. | G06F 16/4393 |
| 2018/0053379 A1* | 2/2018 | Meyer | ................. | G07F 17/3213 |
| 2019/0378483 A1* | 12/2019 | Kiely | ................. | G10H 1/0025 |
| 2020/0380940 A1* | 12/2020 | Abdallah | ................. | G06N 3/08 |
| 2022/0053248 A1* | 2/2022 | Gilbert | ................. | G11B 27/10 |

* cited by examiner

*Primary Examiner* — Raquel Perez-Arroyo
(74) *Attorney, Agent, or Firm* — DLA Piper LLP US (57) ABSTRACT

A processor may query a database of media compositions with a query specifying at least one attribute from among a plurality of attributes of media compositions. In response to the querying, the processor may receive a returned plurality of the media compositions having the at least one attribute. The processor may arrange the returned plurality of the media compositions into a sequence according to at least one of the plurality of attributes. The processor may render the sequence into a metacomposition, which may be displayed by at least one display device.

20 Claims, 11 Drawing Sheets

MASSIVELY DISTRIBUTED METACOMPOSITION SYSTEMS AND METHODS

DETAILED DESCRIPTION OF SEVERAL EMBODIMENTS

Embodiments described herein relate to Massively Distributed (MD) metacompositions. For example, some embodiments may include web applications or other computing systems that present a user interface (UI) to end users. End users may interact with the UI to submit media. With submissions from many users being obtained and stored, some embodiments may perform a process called "metacomposition," wherein longer-form audio/video pieces are composed out of individual user submissions. For example, this process can include sorting and ordering user submissions according to any number of features or analyses of the user submissions. Each metacomposition may be considered a strategy for curating user submissions instead of (or in addition to) a specific rendering.

Some embodiments of systems that create MD metacompositions may include a front-end, which includes a web application or other UI. Such systems may further include a backend web server and/or other backend systems such as a database system used to collect and sort user-generated submissions. Systems described herein may further include a toolchain and mechanisms used to generate the public realization of MD through collective audio/video artworks called metacompositions. This may include, for example, software that downloads, sorts, and curates user-generated submissions, as well as systems by which these submissions can be rendered at high-fidelity for public exhibition.

As described in detail herein, embodiments described herein may utilize audio signal processing techniques, strict timing for operations, and/or mixtures of software programming paradigms in order to effect improvements in computing operations and performance to deliver metacompositions that may not be possible to deliver without such improvements.

In some embodiments, a metacomposition may include a fixed audio/video file that has some number of user-generated submissions to the MD project. A metacomposition's contents may be selected via a number of search and sorting algorithms ("database queries"). Such queries may be provided and defined by an artist in some examples. Queries may consider submission attributes as detailed below. These attributes may be selected and sorted in isolation or in a hierarchical manner to curate and aggregate user submissions into some larger compositional arc, in some cases taken along with a number of other variables such as total meta composition duration, likelihood of repeating a given user submission, and the moving between various database queries. In this sense, the metacomposition process may amount to applying database query and sorting mechanisms to the field of musical and visual composition.

Figure 1:
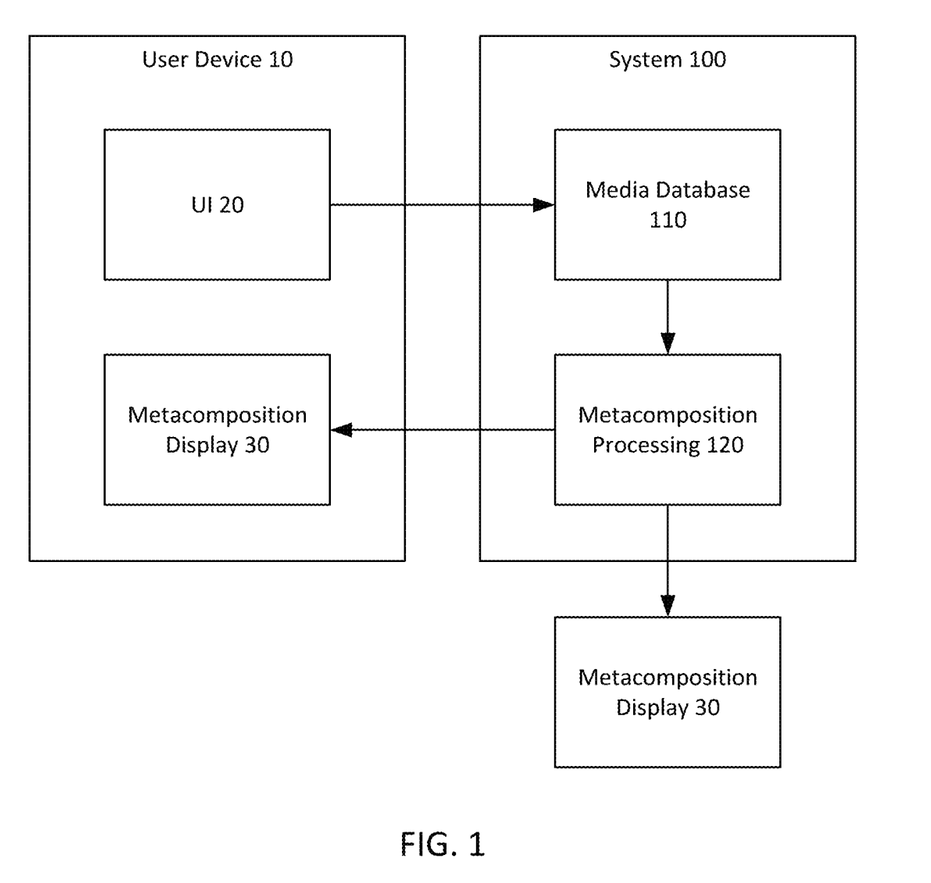
FIG. 1 shows an example Massively Distributed system according to some embodiments of the disclosure.

FIG. 1 shows an example MD system 100 according to some embodiments of the disclosure. System 100 may include a variety of hardware, firmware, and/or software components that interact with one another and with one or more user device(s) 10 and/or metacomposition display devices 30, each of which may be implemented by one or more computers (e.g., as described below with respect to FIG. 6). As described in detail below, user device 10 can present UI 20, which may include a web app or cloud-based component hosted elsewhere (e.g., by system 100). A user can interact with UI 20 to create media compositions. System 100 may include a media database 110, which can receive and store media compositions created by users. System 100 may further include metacomposition processing 120, which may create metacompositions from data in the media database 110 as described in detail below. Metacomposition display devices 30, which may be the same devices as user devices 10 in some cases (e.g., a media player or web app of user device 10 may function as metacomposition display device 30), may display metacompositions. In some embodiments, user device 10, metacomposition display 30 and system 100 may be in communication through one or more networks such as the Internet. In some embodiments, many user devices 10 and/or many metacomposition displays 30 may be in communication with system 100. FIGS. 2-5 illustrate the functioning of UI 20 and system 100 in detail.

User device 10, metacomposition display 30, system 100, and individual elements thereof (e.g., UI 20, media database 110, metacomposition processing 120, and/or metacomposition display 30 to the extent it is integrated into user device 10) are each depicted as single blocks for ease of illustration, but those of ordinary skill in the art will appreciate that these may be embodied in different forms for different implementations. For example, system 100 may be provided by a single device or plural devices, and/or any or all of its components may be distributed across multiple devices. In another example, while media database 110 and metacomposition processing 120 are depicted separately, any combination of these elements may be part of a combined hardware, firmware, and/or software element. Moreover, while one user device 10 is shown, in practice, there may be multiple user devices 10 and/or multiple users (each with their own account(s)) may share a user device 10. Likewise, there may be one or many metacomposition displays 30, some of which may be part of user device(s) 10 as described above.

Figure 2:
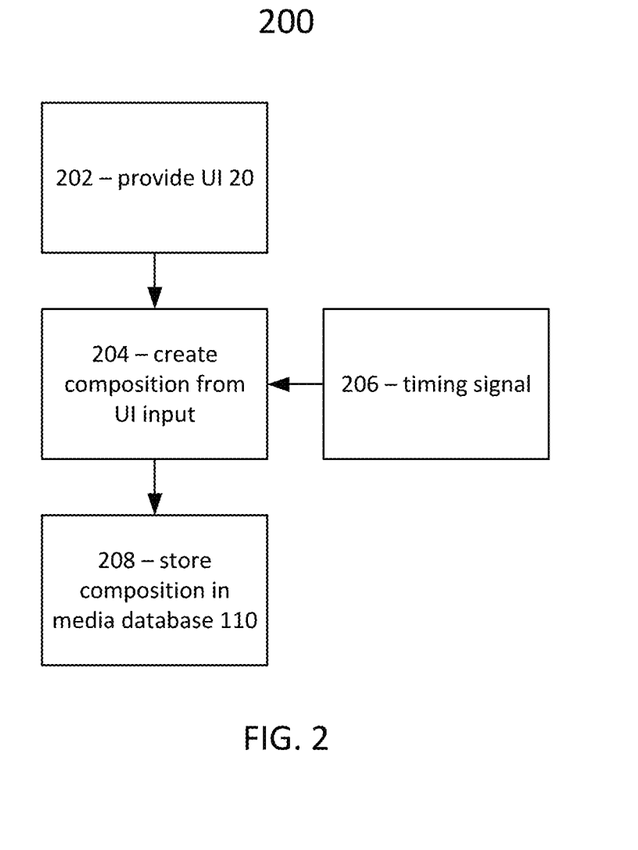
FIG. 2 shows an example composition creation process according to some embodiments of the disclosure.

FIG. 2 shows an example composition creation process 200 according to some embodiments of the disclosure. User device 10 and/or system 100 may perform process 200 to enable users to create compositions that may be later used by system 100 to create metacompositions.

At 202, user device 10 may provide UI 20, for example by launching a web app or navigating to a website. Specific examples of UI 20 features and/or functionality are detailed below with respect to 204.

At 204, user device 10 and/or system 100 may create a composition from input made to UI 20. The composition may be created locally at user device 10 through interactions with UI 20 and then sent to system 100 in some embodiments. In other embodiments, UI 20 may send data describing interactions to system 100, and some or all processing to create compositions may be performed at system 100. In either case, FIGS. 3A-3F show example UI 20 elements according to some embodiments of the disclosure, which provide further details of how the composition may be created in some examples.

Figure 3A:
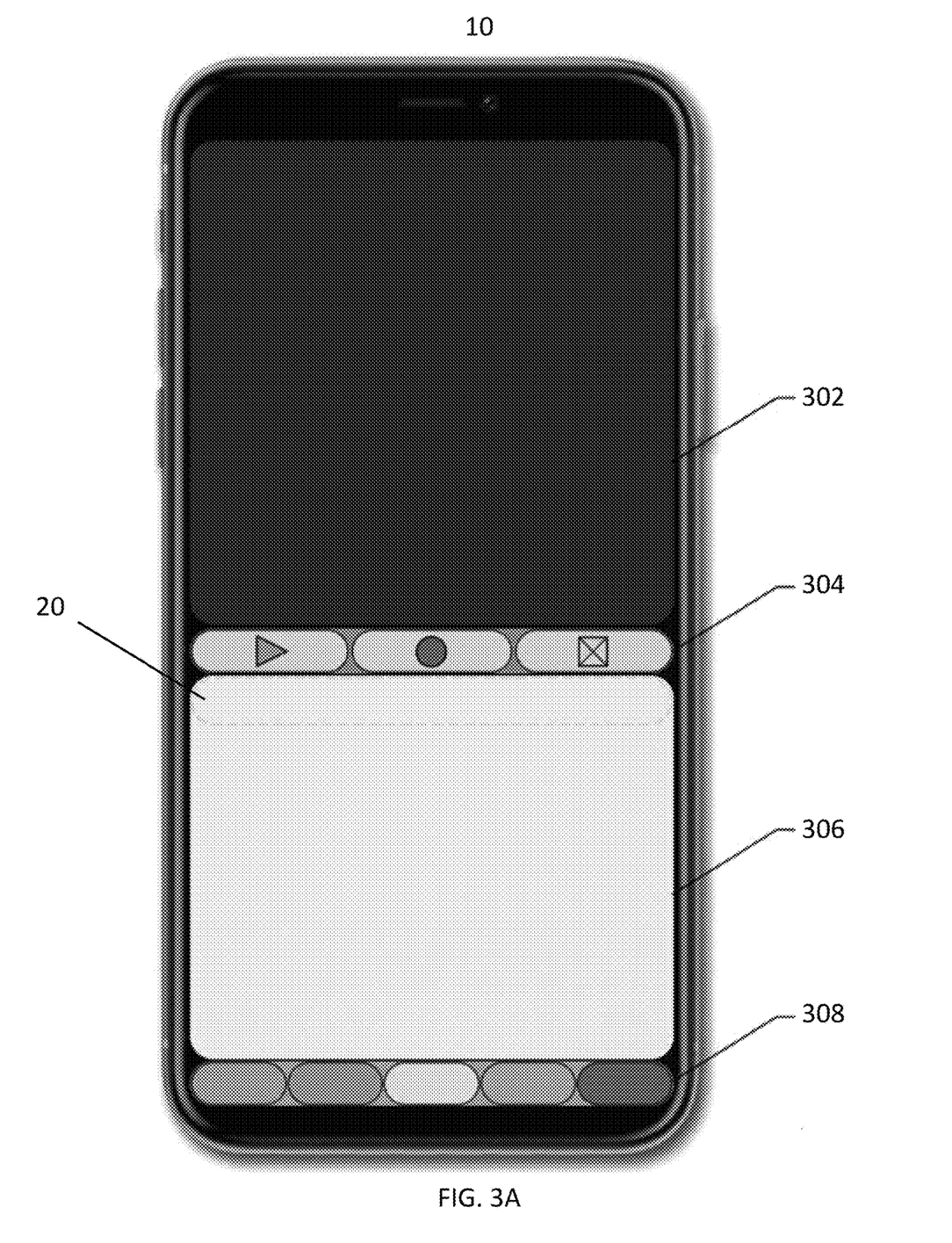
FIGS. 3A-3F show example user interface elements according to some embodiments of the disclosure.

FIG. 3A shows an example of an overall UI 20 layout in some embodiments. UI 20 may include display/canvas 302. Within display/canvas 302, users may be able to live preview visuals correlated with audio parameters made using input tabs as described below. For example, when the end-user interacts with UI 20, they may activate audio/visual events in the display/canvas 302. In some examples, audio and video that is played within UI 20 can be locationally specific samples that are recorded in and around the city where an overall MD project is being presented, although other audio and video samples can be used in other embodiments.

UI 20 may also include play bar 304. In the example play bar 304 of FIG. 3A, there are three buttons that may remain static throughout user navigation of the tabs as described below. For example, play bar 304 may include a play button, record button, and stop/clear button, which all may control the current composition.

UI 20 may also include main body 306. Depending on which tab is selected, the main body 306 may display the respective interface, user input buttons, sliders, and selections, as described below.

UI 20 may also include navigation tabs 308. In the example of FIG. 3A, navigation tabs 308 include five tabs located at the bottom of screen that may be used to access the beat pad, sequencer, mixer, effects, and share tabs that each hold their respective features as illustrated in FIGS. 3B-3F.

Figure 3B:
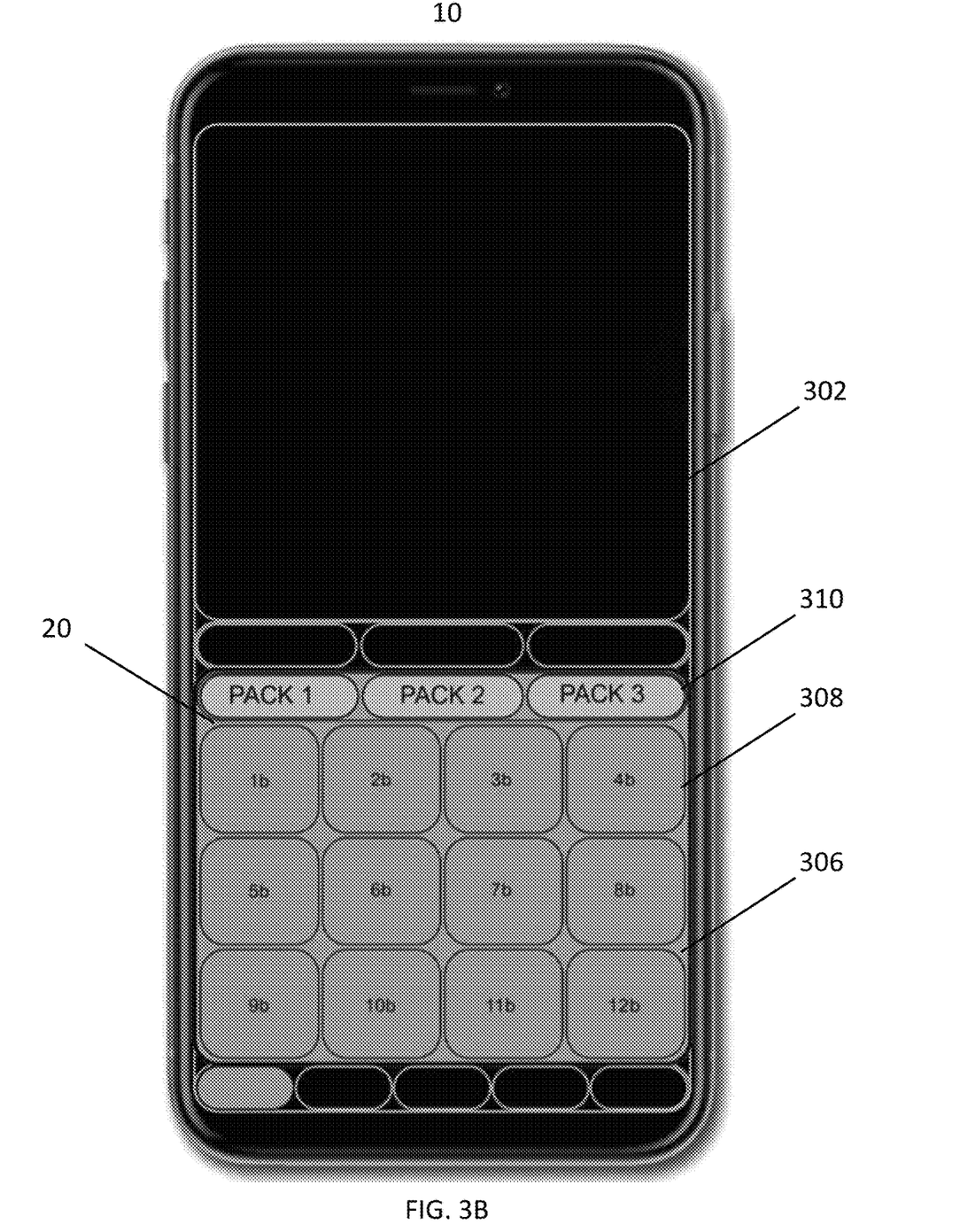

In FIG. 3B, main body 306 displays a beat pad tab interface, which in the illustrated example holds a 4 by 3 grid of 12 buttons 308 each triggering a sound and visual. Above these, there is a row of three buttons 310 that allow the user to switch between media pack options. These media pack selection buttons may also be found on the sequencer view and mixer view described below. In some embodiments, groups of audio/video samples ("sample packs") are created by going out in the field and recording sights and sounds of a particular location associated with the MD project. Then, these raw samples may be edited, trimmed, and processed to prepare them for use in MD. Whenever a user logs into the UI 20, they may be presented with three unique sample packs which contain samples from a given location in this embodiment.

Figure 3C:
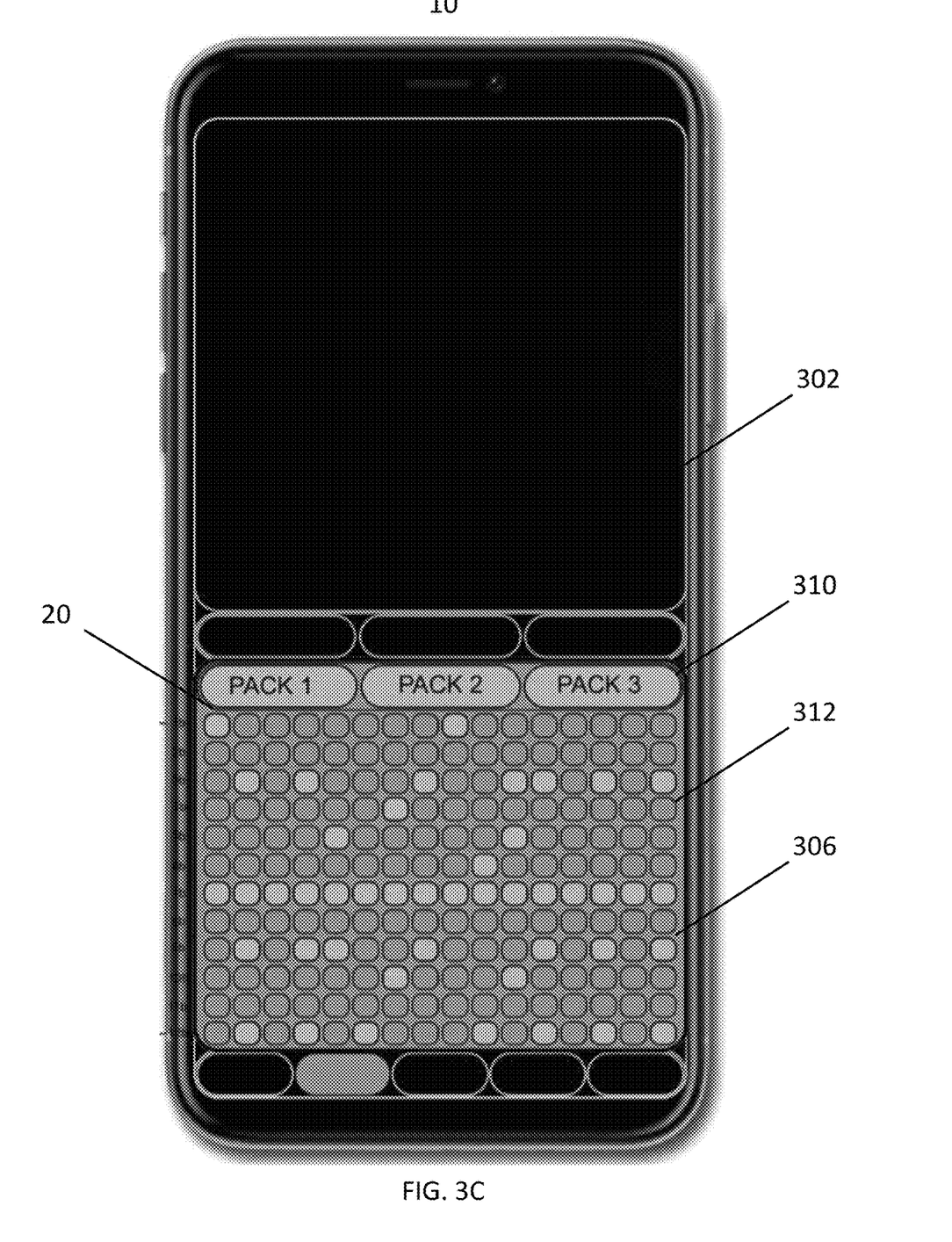

In FIG. 3C, main body 306 displays a sequencer tab interface, which in the illustrated example holds a 16×12 grid of buttons 312 for the 16 beats/subdivisions in time and 12 down, one row for each sample in the selected pack. These buttons may be used to view the composition. When lit up, they are triggering media samples, and when ghosted they are not. This interface may include a time signature marker that passes from left to right in sync with the tempo.

Figure 3D:
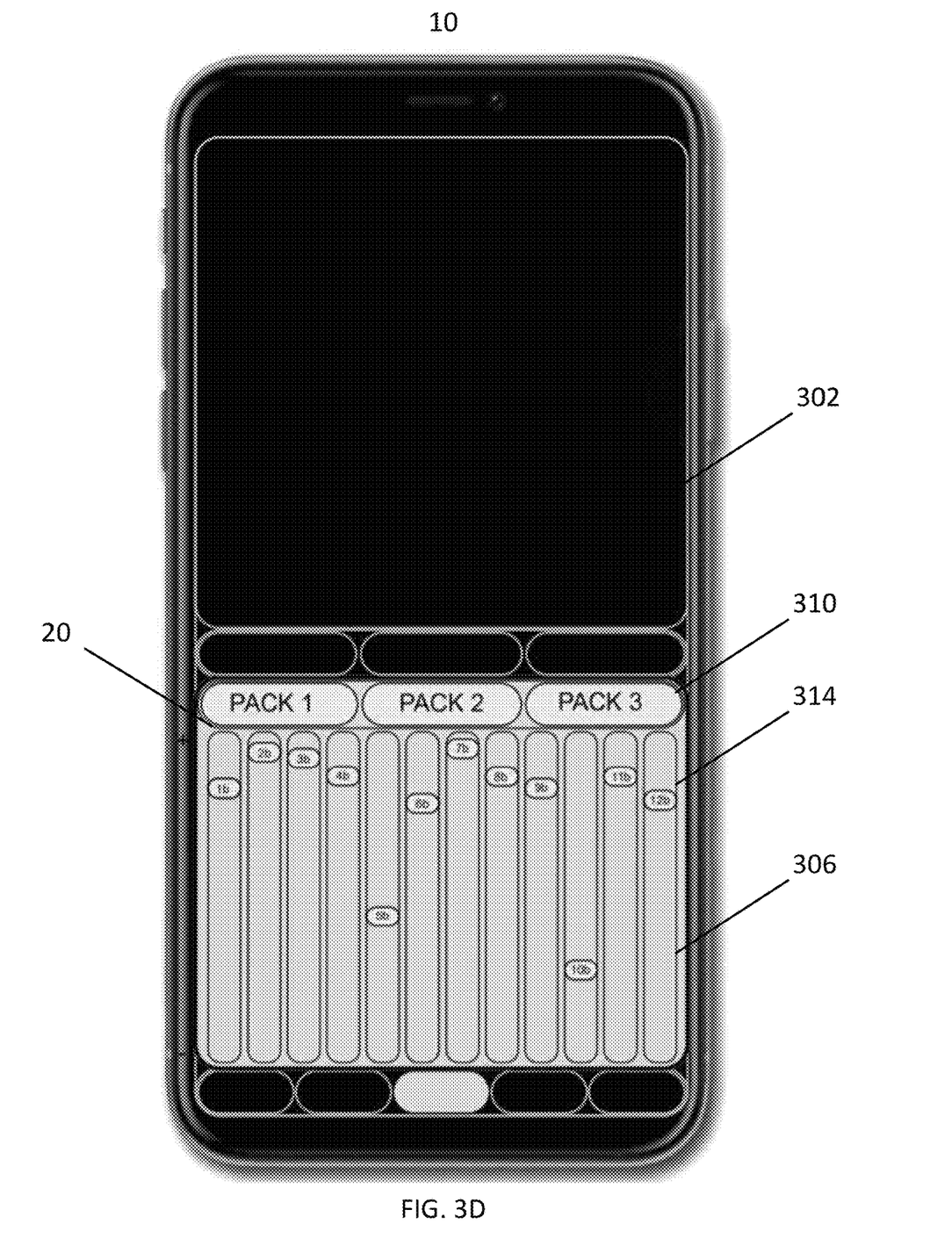

In FIG. 3D, main body 306 displays a mixer tab interface, which in the illustrated example includes a series of 12 sliders 314 that operate from top to bottom. Each slider may correspond to a sound. When the slider is at the top it is max volume, and when the slider is at the bottom the sound is muted (although the orientation may be reversed in other embodiments).

Figure 3E:
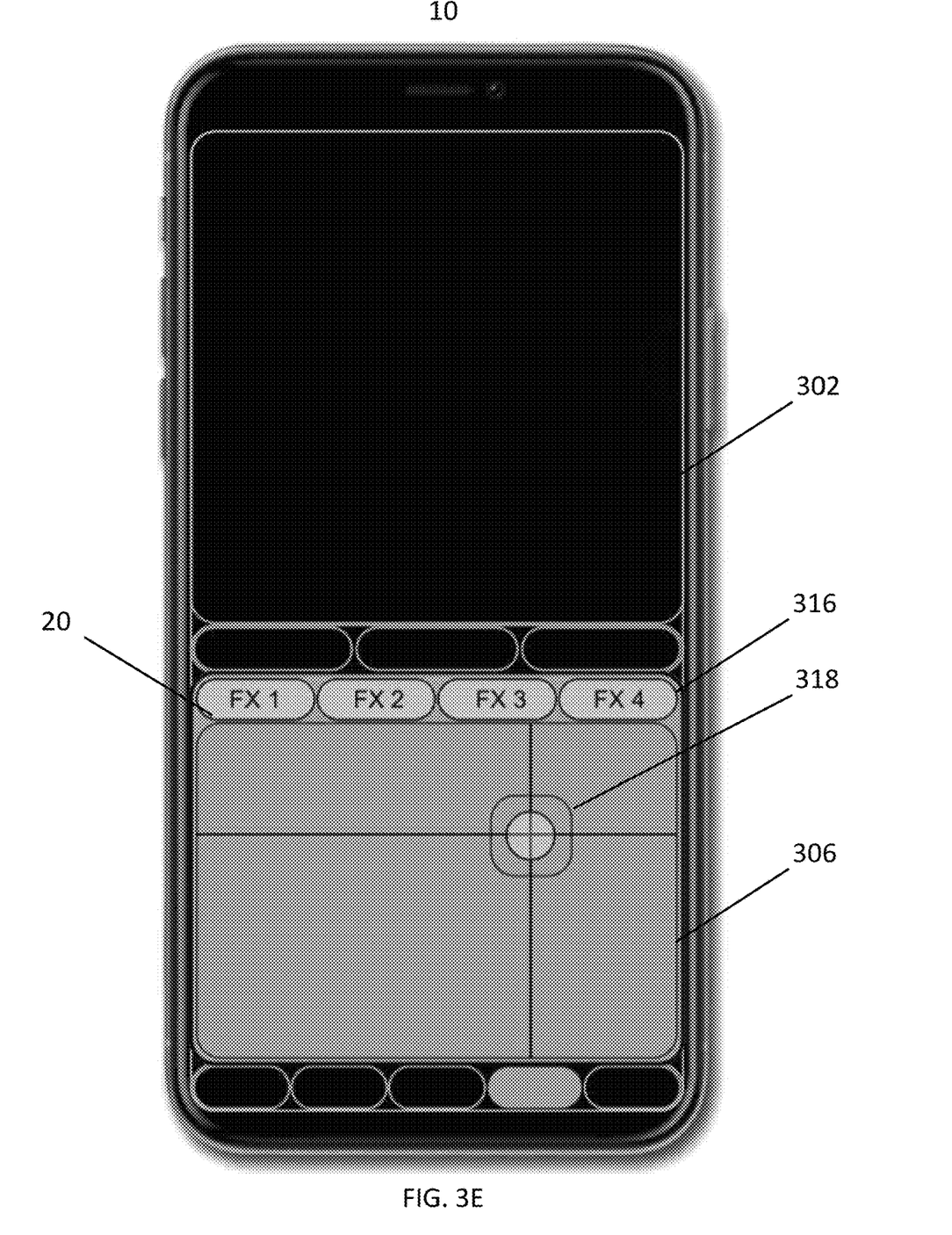

In FIG. 3E, main body 306 displays an effects tab interface, which in the illustrated example may allow users to add live effects to the recorded media as well capture them within the composition. At the top of the view there are four buttons 316 used to select varying effect options. When a button is lit up, the selected effect may be triggered. The main adjustment of the effect may be operated by dragging the intersection marker 318. The audio effects within the UI 20 may include custom-written signal processing filters created using the WebAudio API and/or through other processes. These effects may include delay, distortion, reverb, a low-pass filter, and/or others. In some embodiments, the filters used within the UI 20 may be custom implementations that operate in conjunction with paired video processing filters (e.g., WebGL shaders).

Figure 3F:
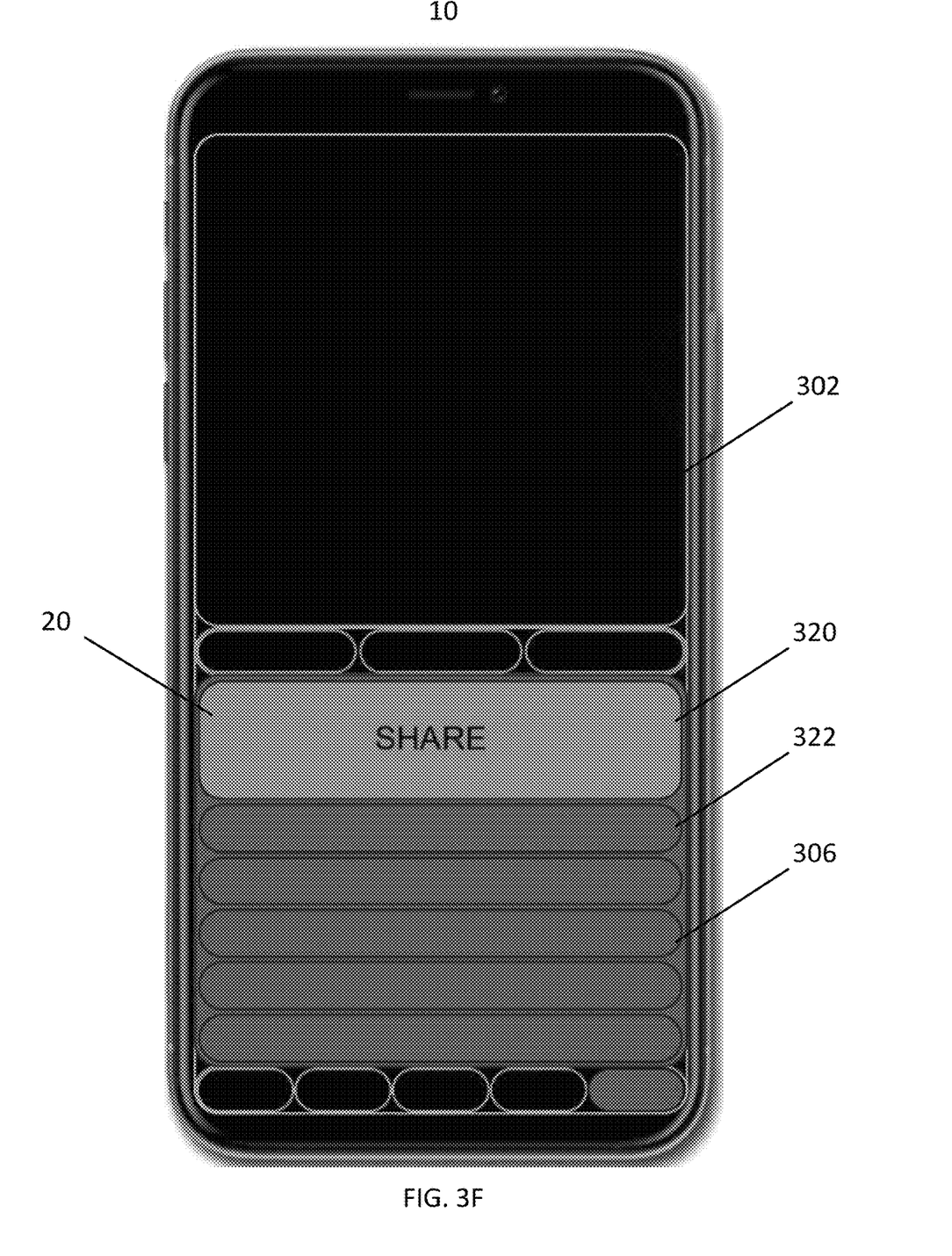

In FIG. 3F, main body 306 displays a share/options tab interface. The large button 320 at the top of this section is for the share option. The buttons/sliders 322 below may provide advanced editing options for the composition. These edits may include tempo, sequence length, and/or others. This page may also include links and/or other information.

Using the various tabs on the UI 20 described above, a user may create a short composition or beat with the sample packs offered. These user-created compositions may be on the order of 20-45 seconds in length in some embodiments. Users may be able to perform into the app, recording their beat as they go, in the beat pad tab. They may view and edit their composition in the sequencer tab. They may adjust each sample's volume and brightness in the mixer tab. They may add and record various effects on top of their composition in the effects tab (e.g., effects such as distortion, reverb, delay, flanger, etc.).

In some embodiments, UI 20 may be constructed and arranged to make use of a number of software dependencies. For example, some embodiments of UI 20 may utilize one or more previously existing software libraries, composed in a unique way to create the graphical user interface (GUI) that is seen when visiting the MD webpage and/or using the MD web app.

For example, UI 20 may be built using the React framework. React is a JavaScript library for creating single-page-applications (SPAs) that was created and is primarily maintained by Facebook. React does not, itself, dictate any of the graphical elements, characteristics or attributes of the content within a given SPA; instead it provides a framework for building complex applications, maintaining state, and tracking user interaction in a more intuitive way than vanilla JavaScript.

Some embodiments of UI 20 may use the Material-UI library, which can provide many of the graphical elements seen within the UI 20 and described above, such as the various sliders, text entry boxes, and many of the buttons.

Some embodiments of UI 20 may use the PixiJS library for real-time video playback, manipulation, and rendering. PixiJS is a WebGL-enabled lightweight library that provides mechanisms for loading visual assets like videos, sprite sheets, and images, while providing mechanisms for blending these assets, manipulating them using WebGL shaders, and rendering them to a WebGL context. Some embodiments of UI 20 may use the Pixi-Sound library as a module to the PixiJS library for audio processing and playback.

Returning to FIG. 2, during composition creation using UI 20, a user may wish to play back a draft version of their composition during the process. At 206, system 100 and/or user device 10 may create or obtain a timing signal, or timing thread, that may be used to govern composition display timing. This may include execution of a performance thread displaying the composition and a timing thread controlling the timing of the displaying of the composition based on the signal received at 206.

One of the challenges in creating an audio-focused application is maintaining strict and reliable timing, assuring that sounds are triggered at the desired points in time, while not being subject to any gross latency. Modern operating systems are subject to interrupts, whereby the operating system can suspend processes in order to tend to other tasks as needed. Any strictly timed workflows, such as those related to music or sound performance, may require ways to work around this behavior.

In order to address this issue, system 100 and/or user device 10 may employ a custom web worker to maintain strict timing, regardless of any potentially interrupting user-initiated events. Web Workers function by running on a separate thread from other user interactions, and are thus able to maintain their own timing and operations, running concurrently to other web app processes. For example, system 100 and/or user device 10 may operate a single instance of a class called MdMetronome. This class may be responsible for dispatching time-related events, including transport bar updates (indicating on the UI what beat is currently being played), as well as triggering audio/visual samples. Within the instance of MdMetronome is the web worker instance, MdTimerWorker, which starts when the user clicks play, and emits "tick" messages at a regularly timed interval. These "tick" messages are then received by MdMetronome and used to activate any note events required.

At 208, in response to a user command, user device 10 may provide instructions to system 100 that the composition is ready to be stored in media database 110. System 100 may store the composition in media database 110. When the user/participant is done composing their beat/composition, they can title it and include their DJ name, and then press the share button 320 in the UI 20, uploading their composition to media database 110 for inclusion in the public installation of MD.

In order for system 100 to insert the composition into media database 110, the submission may include one or more attributes such as the following:

title: An optional title for the user-created composition, which may be blank or empty.

created_by: An optional author/artist name provided by the submitting user, which may be blank or empty.

comp: This is the raw composition represented as a 2-dimensional array (or other discrete element list or array, such as an integer array, Boolean array, or other list or array structure), with a column for each available point in time (beat or subdivision), and a row for each available sample. In some embodiments, events (triggering audio/video playback) are represented as 1s, while 0s indicate no trigger event.

compLength: This is an integer value indicating how long the user submission is. This may be a user-set value, allowing for the beat pattern to repeat at a given length (e.g., with possible values in the range of 9-16). This may be treated similarly to a time signature in a musical setting.

tempo: User-set tempo for the submission, in beats per minute.

mixerState: Stores a representation of the mixer interface indicating related volume/opacity of each sample.

fxState: Stores the static state of the effects layers.

fxRecording: If the user recorded dynamic effects, this attribute may store this recording as a 2-dimensional array. Otherwise, this attribute may be empty.

packRefPaths: Identifies the samples used by the user. Periodically, sample packs may be swapped for new samples by an admin of system 100 and/or an automatic process, providing new content to UI 20 users, while removing previous sample content. This attribute allows system 100 to correctly render user submissions that made use of previously available samples.

version: Identifies the version of MD that was used to create this submission, ensuring that system 100 is parsing the submission data accurately.

When a user submits their composition through the UI 20, system 100 may preprocess it in a number of ways prior to inserting it into the database 110 for storage. This preprocessing may assert the existence and validity of the above-listed attributes and may generate a number of additional descriptors that may be later used during the metacomposition process. These additional attributes may include the following:

created_on: The date and timestamp when the submission was sent to system 100.

count_packs: A raw integer count of the number of times samples from each of the available three sample packs were used. If, for instance, a user submission has 20 note events, all using samples from the first sample pack, this attribute would be set to {0: 20, 1: 0, 2: 0}, indicating 20 note events triggering from the first sample pack, and zero from each of the other available sample packs.

count_tracks: Similar to count_packs, but at a per-sample level. This may be a raw count of the number of note events for each available sample within the given submission.

density: The number of note events in the submission divided by the number of available note event positions (beats or subdivisions without note events).

pack_densities: Same as density, but separated by sample pack.

pack_ratio: Equal to the values in count_packs divided by the total number of note events in the entire submission.

These various descriptors and attributes may be used in later steps as part of the metacomposition process as described below. With these additional attributes calculated, system 100 may insert the submission into the database 110.

Figure 4:
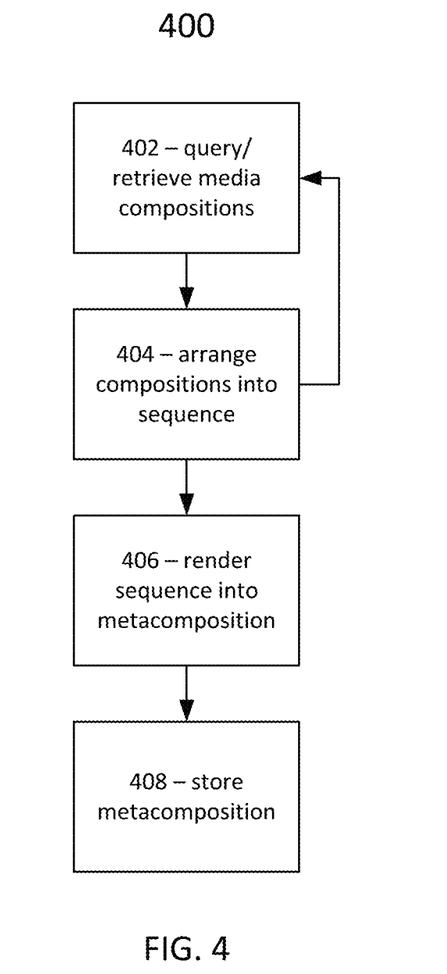
FIG. 4 shows an example metacomposition creation process according to some embodiments of the disclosure.

FIG. 4 shows an example metacomposition creation process 400 according to some embodiments of the disclosure. System 100 can perform process 400 to create metacompositions using the compositions submitted into media database 110 by process 200 and/or other compositions. In some embodiments, some or all portions of process 400 may be performed in response to commands from users (e.g., artists) assembling the metacom positions, which may be facilitated by a UI provided by system 100. Remaining portions may be performed automatically by system 100. In some embodiments, process 400 may be entirely automatic, generating metacompositions without user input.

With submissions from many users being saved to database 110, metacomposition creation process 400 may compose longer-form audio/video pieces out of individual user submissions. This may be done by sorting and ordering user submissions according to any number of features or analyses of the user submissions. Each metacomposition may be considered more a strategy for curating user submissions than a specific rendering. Metacom positions may employ features such as: note density, tempo, prevalence of specific samples or sample packs, degree of use of effects and processing (more distortion or echo-laden submissions grouped together, for example), the dominance of a specific color or color palette within a user submission (based on sample usage), etc. Traits like those listed above may be used singularly or in combination to produce a metacomposition of some desired length (for example, on the order of 10-20 minutes). In some embodiments, process 400 may be carried out within TouchDesigner (TD), a node-based program for real-time graphics rendering and interactive systems. TD has fully integrated support for scripting using the Python scripting language, which allows development of custom scripts for metacomposition creation and/or other purposes.

At 402, system 100 may query media database 110 with a query specifying at least one attribute from among the plurality of above-listed attributes of media compositions. The query can include the attributes included in the user submission at 206 and/or the attributes added during subsequent preprocessing as described above. In response to the query, system 100 may receive a returned plurality of the media compositions having the at least one attribute. In an artist-directed example, the user can specify one or more filter parameters and thereby search for certain attributes of interest such as tempo, note density, etc.

At 404, system 100 may arrange the media compositions returned at 402 into a sequence. For example, media compositions may be arranged into the sequence according to at least one of the attributes (e.g., the attribute that was the subject of the query or a different system 100 selected or user selected attribute). The arranging may include, but is not limited to, removing at least one media composition from the returned plurality of media compositions, repeating at least a portion of the returned plurality of the media compositions in the sequence, removing at least a portion of the returned plurality of the media compositions from the sequence, and/or receiving a user input and modifying the sequence according to the user input.

For example, a user may sort the query results according to any of the submission attributes. This may, for example, take the form of sorting all results according to the tempo of each submission, in either ascending or descending order, resulting in the aggregate increasing or decreasing in tempo over playback. The user may listen back to the query results, with the metacomposition software rendering all audio and visual samples in real time, along with all processing effects. The user may add the sorted results to a metacomposition draft in part or in whole and/or make use of options such as the following examples:
  Randomly drop out some percentage of user-generated submissions from the candidate sequence, maintaining the ordering of those that remain. This produces a shorter candidate sequence. The percentage of drop-out may be a parameter set by the artist.
  Randomly repeat a percentage of the user-generated submissions in the candidate sequence. This produces a longer candidate sequence. The repeat percentage may be a parameter set by the artist.
  Manually remove any of the user-generated submissions from the candidate sequence.
  Manually set the number of repeats for each user-generate submission in the candidate sequence.

System 100 may repeat processing at 402 and 404 using different queries and sorting options until the meta composition is complete. Using different queries and sorting options at 402, along with different parameters at 404, may result in a longer metacomposition that can change over time. The artist's "voice" in the metacomposition process comes from the decisions the artist makes at 402 and 404.

Figure 5:
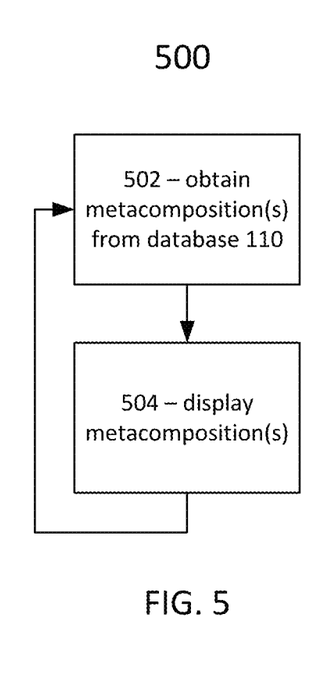
FIG. 5 shows an example metacomposition display process according to some embodiments of the disclosure.

At 406, system 100 may render the sequence created at 404 into a metacomposition (e.g., a fixed audio and/or video file), and at 408, system 100 may store the metacomposition in database 110 or other memory from which it may be performed (e.g., according to process 500 described below).

As a non-limiting example, a metacomposition might include one or multiple sections, each being defined by a particular sorting and querying strategy such as the following:
  For time 0:00-5:00:
    Query submissions: created after 10/30/2020; pack 3 ratio=0%; user applied effects=True; tempo is greater than 60 bpm. Sort by: note density, ascending order.
  For time 5:00-10:00:
    Query submissions: created after 10/30/2020; pack 1 ratio=0%. Sort by: pack 2 ratio, descending order; and tempo, descending order.

The above example strategy would result in a 10 minute-long metacomposition being produced from available user submissions. If this same strategy were implemented again at a later time, it may result in a different metacomposition being rendered, provided that additional user submissions had been created and stored in database 110.

FIG. 5 shows an example metacomposition display process 500 according to some embodiments of the disclosure. System 100 may perform process 500 to cause one or more metacompositions to be displayed by metacomposition display 30, on demand and/or continuously, in a public installation and/or in an individual setting (e.g., by user device 10).

At 502, system 100 may obtain one or more metacompositions from database 110. Metacompositions may be created and stored in database 110 by process 400 as described above and/or in some other manner in some embodiments. For example, a metacomposition file may be loaded into a media player/server for playback during public exhibition.

At 504, system 100 may cause the retrieved one or more metacompositions to be displayed by at least one display device (e.g., metacomposition display 30).

In some embodiments, one or more metacomposition displays 30 may be part of a public installation, for example with building facade projection and sound. This public installation rendition of MD shares the user-created compositions with the public and invites further public engagement with the project through the web app or website based UI 20. During a multi-day installation and event with MD, new metacompositions may be produced each day, incorporating new user submissions. As shown in FIG. 5, system 100 may continuously, periodically, or occasionally obtain new metacomposition(s) from database 110 and incorporate them into the MD display at 504.

Figure 6:
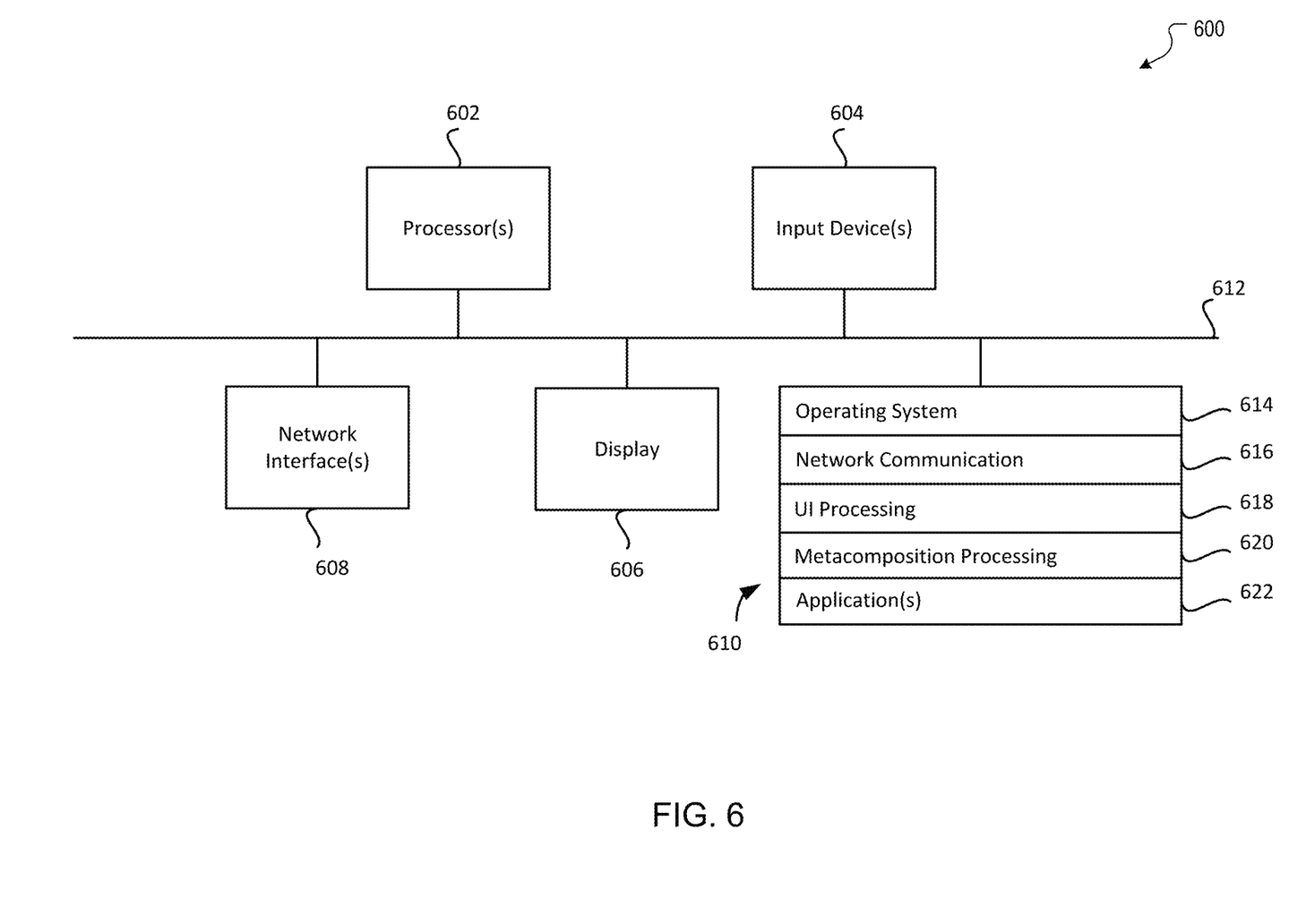
FIG. 6 shows a computing device according to some embodiments of the disclosure.

FIG. 6 shows a computing device 600 according to some embodiments of the disclosure. For example, computing device 600 may function as system 100 or any portion(s) thereof, or multiple computing devices 600 may function as system 100. In some examples, computing device 600 may function as user device 10, metacomposition display device 30, and/or any combination of user device 10, metacomposition display device 30, and system 100.

Computing device 600 may be implemented on any electronic device that runs software applications derived from compiled instructions, including without limitation personal computers, servers, smart phones, media players, electronic tablets, game consoles, email devices, etc. In some implementations, computing device 600 may include one or more processors 602, one or more input devices 604, one or more display devices 606, one or more network interfaces 608, and one or more computer-readable mediums 610. Each of these components may be coupled by bus 612, and in some embodiments, these components may be distributed among multiple physical locations and coupled by a network.

Display device 606 may be any known display technology, including but not limited to display devices using Liquid Crystal Display (LCD) or Light Emitting Diode (LED) technology. Processor(s) 602 may use any known processor technology, including but not limited to graphics processors and multi-core processors. Input device 604 may be any known input device technology, including but not limited to a keyboard (including a virtual keyboard), mouse, track ball, and touch-sensitive pad or display. Bus 612 may be any known internal or external bus technology, including but not limited to ISA, EISA, PCI, PCI Express, NuBus, USB, Serial ATA or FireWire. In some embodiments, some or all devices shown as coupled by bus 612 may not be coupled to one another by a physical bus, but by a network connection, for example. Computer-readable medium 610 may be any medium that participates in providing instructions to processor(s) 602 for execution, including without limitation, non-volatile storage media (e.g., optical disks, magnetic disks, flash drives, etc.), or volatile media (e.g., SDRAM, ROM, etc.).

Computer-readable medium 610 may include various instructions 614 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input device 604; sending output to display device 606; keeping track of files and directories on computer-readable medium 610; controlling peripheral devices (e.g., disk drives, printers, etc.) which can be controlled directly or through an I/O controller; and managing traffic on bus 612. Network communications instructions 616 may establish and maintain network connections (e.g., software for implementing communication protocols, such as TCP/IP, HTTP, Ethernet, telephony, etc.).

UI processing 618 may include the system elements and/or the instructions that enable computing device 600 to perform processing related to UI 20 (e.g., process 200) as described above. Metacomposition processing 620 may include the system elements and/or the instructions that enable computing device 600 to perform the metacomposition processing 120 of system 100 and/or display of metacompositions (e.g., processes 400 and/or 500) as described above. Application(s) 622 may be an application that uses or implements the outcome of processes described herein and/or other processes. In some embodiments, the various processes may also be implemented in operating system 614.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as an LED or LCD monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API and/or SDK, in addition to those functions specifically described above as being implemented using an API and/or SDK. An API may define one or more parameters that are passed between a calling application and other software code (e.g., an operating system, library routine, function) that provides a service, that provides data, or that performs an operation or a computation. SDKs can include APIs (or multiple APIs), integrated development environments (IDEs), documentation, libraries, code samples, and other utilities.

The API and/or SDK may be implemented as one or more calls in program code that send or receive one or more parameters through a parameter list or other structure based on a call convention defined in an API and/or SDK specification document. A parameter may be a constant, a key, a data structure, an object, an object class, a variable, a data type, a pointer, an array, a list, or another call. API and/or SDK calls and parameters may be implemented in any programming language. The programming language may define the vocabulary and calling convention that a programmer will employ to access functions supporting the API and/or SDK.

In some implementations, an API and/or SDK call may report to an application the capabilities of a device running the application, such as input capability, output capability, processing capability, power capability, communications capability, etc.

Some embodiments of computing device(s) 600 employed herein may use a mixture of programming paradigms to provide the above-referenced processing. For example, the React framework prefers to primarily be used through reactive or functional programming paradigms, with a number of characteristics and traits borrowed from a declarative programming paradigm. A declarative programming paradigm prefers to never modify data in place (no mutations). Instead, data is passed to functions which then return some data that may be a modified version of the input. Reactive programming allows for any modifications or state changes to automatically propagate through the program, triggering updates to program state, interface appearance, etc. In practical terms, this means that when a state variable changes in a webapp built with React, it will trigger a cascade of events, including rerendering of relevant on-screen elements to accurately reflect these internal changes. This rerendering step is slow and time consuming, compared to the update rate required to produce a convincing audio/visual composition and playback.

In contrast to reactive and declarative programming paradigms, WebGL and Web Audio frameworks, such as PixiJS and Pixi-Sound, are written from the perspective of imperative programming. In this case, WebGL and Web Audio modify variables in place (mutation) and even operate in a purely procedural manner, with WebGL shaders and Web Audio API filters both acting as step-by-step instructions for modifying input variables. In this case, modifying any such variables in place should not cause other parts of the program-at-large to rerender, modify, or trigger major events.

These two paradigms stand in contrast to each other. Because MD makes use of different libraries that respectively prefer different paradigms, all within one UI 20 and/or system 100, some embodiments may employ a number of workarounds to carefully control when and what is allowed to trigger screen element rerenderings (from React events), versus what is allowed to be modified in-place while keeping the React framework ignorant of these elements and changes.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A method comprising:

for a plurality of client devices, causing, by a processor, a user interface to be provided, the user interface being configured to obtain user selections defining respective media compositions associated with a location, the respective media compositions comprising respective media selections from respective at least one sample packs of a plurality of sample packs associated with the location and including media previously recorded at the location;

causing, by the processor, the respective media compositions to be stored in a database of media compositions;

at a first time:

querying, by the processor, the database of media compositions with a query specifying at least one attribute from among a plurality of attributes of media compositions, the at least one attribute comprising at least one feature of at least one of the plurality of sample packs;

in response to the querying, receiving, by the processor, a returned plurality of the media compositions having the at least one attribute;

arranging, by the processor, the returned plurality of the media compositions into a sequence according to at least one of the plurality of attributes;

rendering, by the processor, the sequence into a first metacomposition corresponding to the query and including contributions generated at the location by multiple ones of the plurality of client devices; and causing, by the processor, the first metacomposition to be displayed by at least one display device at the location;

for a second plurality of client devices, causing, by the processor, the user interface configured to obtain the user selections defining the respective media compositions associated with the location to be provided at a second time later than the first time;

causing, by the processor, additional respective media compositions from the second plurality of client devices to be stored in the database of media compositions; and at a third time later than the second time, wherein a content of the database of media compositions is different from a content of the database of media compositions at the first time:

querying, by the processor, the database of media compositions with the query specifying the at least one attribute from among the plurality of attributes of media compositions;

in response to the querying, receiving, by the processor, a second returned plurality of the media compositions having the at least one attribute;

arranging, by the processor, the second returned plurality of the media compositions into a second sequence according to at least one of the plurality of attributes;

rendering, by the processor, the second sequence into a second metacomposition corresponding to the query, wherein the second metacomposition from the query is different in content from the first metacomposition from the query and includes contributions generated at the location by multiple ones of the second plurality of client devices; and causing, by the processor, the second metacomposition to be displayed by at least one display device at the location.

2. The method of claim 1, wherein the querying is performed in response to a request received by the processor, the querying further comprising identifying, from the request, at least one filter parameter indicative of the at least one attribute.

3. The method of claim 1, wherein the causing the respective media compositions to be stored comprises defining one or more of the plurality of attributes of the respective media compositions.

4. The method of claim 1, the user interface enables selection of samples obtained from an environment associated with the display device for inclusion within at least one of the respective media compositions.

5. The method of claim 1, wherein the causing of the user interface to be provided comprises execution of a performance thread displaying the at least one of the media compositions and a timing thread controlling the timing of the displaying of the at least one of the media compositions.

6. The method of claim 1, wherein, for each of the media compositions, the plurality of attributes comprise at least one of:
a title;
a creator identifier;
a two-dimensional array representation of the media composition;
a length of the media composition;
a tempo of the media composition;
a representation of an interface used to create the media composition;
a static state of at least one effects layer of the media composition;
a discrete element list or array representation of at least one dynamic effect of the media composition;
an identification of samples in the media composition;
a version identifier;
a timestamp;
a count of samples in the media composition;
a count of note events within samples in the media composition;
a density of note events in the media composition;
a density of note events per sample pack in the media composition; and
a ratio of sample note events to total note events in the media composition.

7. The method of claim 1, wherein the arranging further comprises removing at least one media composition from the returned plurality of media compositions.

8. The method of claim 1, wherein the arranging further comprises repeating at least a portion of the returned plurality of the media compositions in the sequence.

9. The method of claim 1, wherein the arranging further comprises removing at least a portion of the returned plurality of the media compositions from the sequence.

10. The method of claim 1, wherein the arranging further comprises receiving a user input and modifying the sequence according to the user input.

11. A system comprising:
a processor; and
a non-transitory memory in communication with the processor storing a database of media compositions and instructions that, when executed by the processor, cause the processor to perform processing comprising:
for a plurality of client devices, causing a user interface to be provided, the user interface being configured to obtain user selections defining respective media compositions associated with a location, the respective media compositions comprising respective media selections from respective at least one sample packs of a plurality of sample packs associated with the location and including media previously recorded at the location;
causing the respective media compositions to be stored in the database of media compositions;
at a first time:
querying the database of media compositions with a query specifying at least one attribute from among a plurality of attributes of media compositions, the at least one attribute comprising at least one feature of at least one of the plurality of sample packs;
in response to the querying, receiving a returned plurality of the media compositions having the at least one attribute;
arranging the returned plurality of the media compositions into a sequence according to at least one of the plurality of attributes;
rendering the sequence into a first metacomposition corresponding to the query and including contributions generated at the location by multiple ones of the plurality of client devices; and
causing the first metacomposition to be displayed by at least one display device at the location;
for a second plurality of client devices, causing the user interface configured to obtain the user selections defining the respective media compositions associated with the location to be provided at a second time later than the first time;
causing additional respective media compositions from the second plurality of client devices to be stored in the database of media compositions; and
at a third time later than the second time, wherein a content of the database of media compositions is different from a content of the database of media compositions at the first time:
querying the database of media compositions with the query specifying the at least one attribute from among the plurality of attributes of media compositions;
in response to the querying, receiving a second returned plurality of the media compositions having the at least one attribute;
arranging the second returned plurality of the media compositions into a second sequence according to at least one of the plurality of attributes;
rendering the second sequence into a second metacomposition corresponding to the query, wherein the second metacomposition from the query is different in content from the first metacomposition from the query and includes contributions generated at the location by multiple ones of the second plurality of client devices; and
causing the second metacomposition to be displayed by at least one display device at the location.

12. The system of claim 11, wherein the querying is performed in response to a request received by the processor, the querying further comprising identifying, from the request, at least one filter parameter indicative of the at least one attribute.

13. The system of claim 11, wherein the causing the respective media compositions to be stored comprises defining one or more of the plurality of attributes of the respective media compositions.

14. The system of claim 11, wherein the user interface enables selection of samples obtained from an environment associated with the display device for inclusion within at least one of the respective media compositions.

15. The system of claim 11, wherein the causing of the user interface to be provided comprises execution of a performance thread displaying the at least one of the media compositions and a timing thread controlling the timing of the displaying of the at least one of the media compositions.

16. The system of claim 11, wherein, for each of the media compositions, the plurality of attributes comprise at least one of:
- a title;
- a creator identifier;
- a discrete element list or array representation of the media composition;
- a length of the media composition;
- a tempo of the media composition;
- a representation of an interface used to create the media composition;
- a static state of at least one effects layer of the media composition;
- a two-dimensional array representation of at least one dynamic effect of the media composition;
- an identification of samples in the media composition;
- a version identifier;
- a timestamp;
- a count of samples in the media composition;
- a count of note events within samples in the media composition;
- a density of note events in the media composition;
- a density of note events per sample pack in the media composition; and
- a ratio of sample note events to total note events in the media composition.

17. The system of claim 11, wherein the arranging further comprises removing at least one media composition from the returned plurality of media compositions.

18. The system of claim 11, wherein the arranging further comprises repeating at least a portion of the returned plurality of the media compositions in the sequence.

19. The system of claim 11, wherein the arranging further comprises removing at least a portion of the returned plurality of the media compositions from the sequence.

20. The system of claim 11, wherein the arranging further comprises receiving a user input and modifying the sequence according to the user input.

* * * * *